United States Patent [19]

Maeda et al.

[11] Patent Number: 4,639,004
[45] Date of Patent: Jan. 27, 1987

[54] HAND CART WITH FULCRUM LEVER AND VERTICALLY ADJUSTABLE AUXILIARY WHEELS

[75] Inventors: Kazuya Maeda, Osaka; Yasusuke Ishihara, Nara, both of Japan

[73] Assignees: Matsushita Electric Industrial Co., Ltd.; Sano Sharyo Seisakusho Co., Ltd., both of Japan

[21] Appl. No.: 676,381

[22] Filed: Nov. 29, 1984

[30] Foreign Application Priority Data

Nov. 29, 1983 [JP] Japan ............................ 58-184764[U]
Nov. 29, 1983 [JP] Japan ............................ 58-184765[U]
Jan. 13, 1984 [JP] Japan ................................. 59-5095

[51] Int. Cl.⁴ ................................................ B62R 5/02
[52] U.S. Cl. ................................. 280/5.32; 280/47.2; 280/47.27
[58] Field of Search ................. 280/5.22, 5.28, 5.32, 280/47.2, 47.27, 655, 5.3

[56] References Cited

U.S. PATENT DOCUMENTS

| 571,705 | 11/1896 | Thomas | 280/47.2 |
| 878,546 | 2/1908 | Lyon | 280/5.3 |
| 2,518,803 | 8/1950 | Marvin | 280/47.27 |
| 2,651,525 | 9/1953 | Achee | 280/5.32 |
| 2,653,672 | 9/1953 | Wessic | 180/8.2 |
| 2,689,742 | 9/1954 | Gemeinhardt | 280/5.32 |
| 3,788,413 | 1/1974 | Miller | 180/8.2 |

FOREIGN PATENT DOCUMENTS

| 581840 | 10/1924 | France | 280/47.2 |
| 1584132 | 12/1969 | France | |
| 1462104 | 1/1977 | United Kingdom | |

Primary Examiner—John J. Love
Assistant Examiner—Karin L. Ferriter
Attorney, Agent, or Firm—Lowe, Price, LeBlanc, Becker & Shur

[57] ABSTRACT

A hand-propelled cart has a pair of main wheels rotatably mounted on a lower end portion of a body and a handle mounted on an upper end portion of the body. A control lever is pivotably mounted on the body above of the main wheels, and has contact means disposed radially outwardly of the main wheels for contacting a floor to function to function as a fulcrum when the control lever is turned downwardly, for lifting the body and the main wheels off the floor through the leverage of the control lever. The cart even when carrying a heavy cargo can be moved up and down a stair by a single user.

4 Claims, 34 Drawing Figures

FIG. 21
FIG. 22
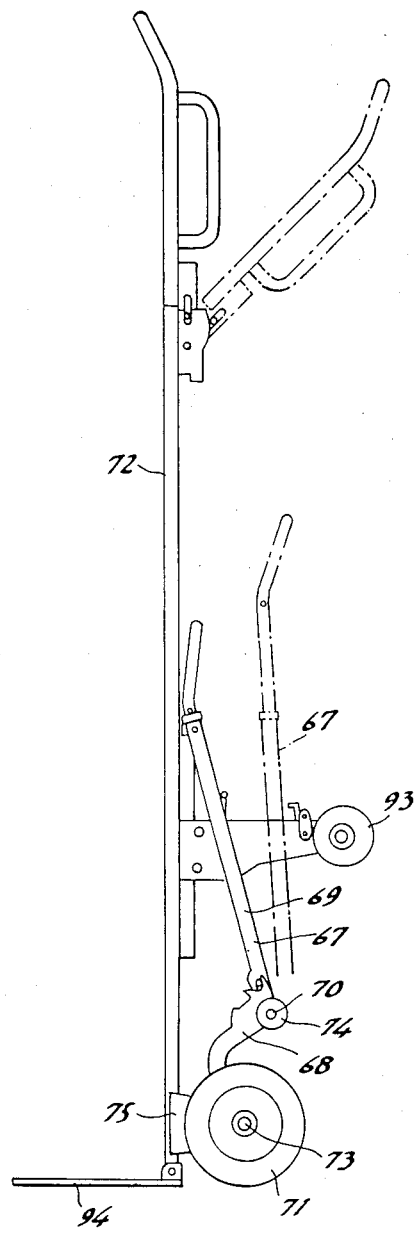
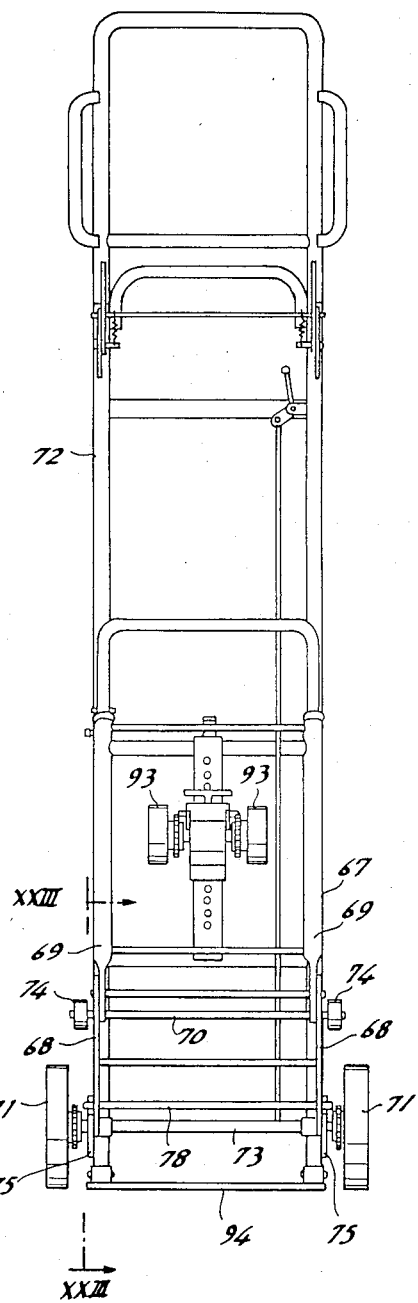

FIG. 23
FIG. 24
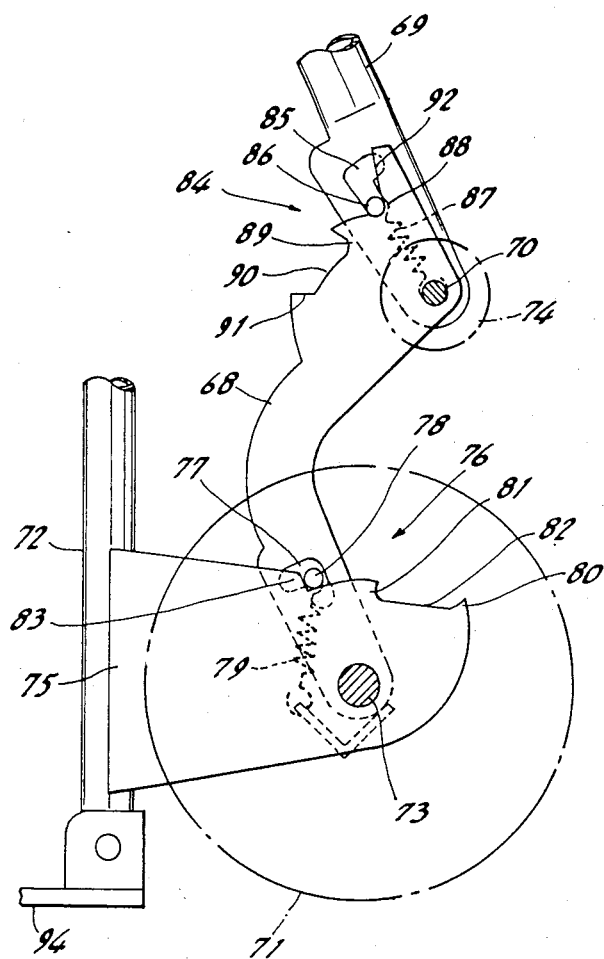
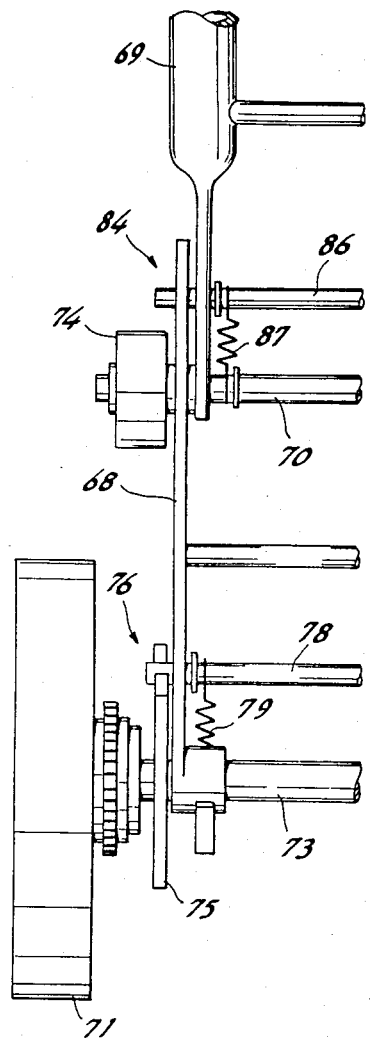

HAND CART WITH FULCRUM LEVER AND VERTICALLY ADJUSTABLE AUXILIARY WHEELS

BACKGROUND OF THE INVENTION

The present invention relates to a hand-propelled cart for carrying relatively large and heavy objects such as electric refrigerators, electric washing machines, pieces of furniture, and cabinets, and more particularly to a hand-propelled cart especially suitable for carrying such objects up and down stairs or loading and unloading objects on and from a truck.

FIGS. 31 through 34 of the accompanying drawings illustrate a conventional hand-propelled cart or trolley. The prior cart includes a body 1' having an L-shaped side elevational configuration, main wheels 2' rotatably mounted on a lower portion of the body 1', and auxiliary wheels 3' rotatably mounted on an upper portion of the body 1', the main and auxiliary wheels 2' and 3' being spaced from each other by an adjustable interaxial distance. The principle of leverage can be used to manipulate the cart to move up and down stairs. More specifically, when moving the cart up a stair, the interaxial distance between the main and auxiliary wheels 2', 3' is adjusted to meet the width and height of a stair step. A handle 4' is depressed to turn the body 1' about the auxiliary wheels 3' on a step and is simultaneously pulled to bring the main wheels 4' onto the same step, as shown in FIG. 32. Then, the handle 4' is raised to turn the body 1' about the main wheels 2' and is simultaneously pulled until the auxiliary wheels 3' are landed on a next upper step. The cart can therefore be moved up stair steps by turning the body 1' about the main and auxiliary wheels 3', 4' alternately and lifting the main and auxiliary wheels 3', 4' alternately up one step at a time. The cart can similarly be moved down a stair by turning the body 1' about the main and auxiliary wheels 3', 4' alternately and lowering the main and auxiliary wheels 3', 4' alternately down one step at a time.

Where a stair has an intermediate landing 5' as shown in FIGS. 33 and 34, it has been impossible to bring the cart from steps onto the landing 5' or from the landing 5' onto steps through the leverage for the reason that the handle 4' would interfere with a wall surface 6' and could not be pulled. It has therefore been customary practice to keep the body 1' erected and lift the same onto the landing 5' or lower the same from the landing 5'.

When a heavy object is carried by the cart, however, it is difficult for one worker to put the cart onto or from the landing 5' and hence a plurality of workers have been required to do the job. This problem manifests itself when a high object such as a refrigerator is carried on a large-size cart.

SUMMARY OF THE INVENTION

With the aforesaid conventional problem in view, it is an object of the present invention to provide a hand-propelled cart which can easily be transferred between stair steps and a small landing connected therewith.

According to the present invention, there is provided a hand-propelled cart including a body having a substantially L-shaped side elevational configuration and including a handle and a cargo rest, a pair of main wheels rotatably mounted on a lower end portion of the body, a pair of auxiliary wheels rotatably mounted on the body above the main wheels, and a control lever pivotably mounted on the body adjacent to the main wheels and having contact means disposed radially outwardly of the main wheels for contacting a floor to function as fulcrums when the control lever is turned downwardly, for lifting the body and the main wheels off the floor through the leverage of the control lever.

With the above arrangement, the cart with a heavy cargo carried thereon can be moved up and down by a single worker, and can smoothly and easily be moved from stair steps to a small landing or vice versa.

BRIEF DESCRIPTION OF THE DRAWINGS

The present invention will be described in detail by way of illustrative examples with reference to the accompanying drawings, in which:

FIG. 21 is a side elevational view of a hand-propelled cart according to a third embodiment of the present invention;

FIG. 22 is a rear elevational view of the hand-propelled cart shown in FIG. 21;

FIG. 23 is a cross-sectional view taken along line XXIII—XXIII of FIG. 22;

FIG. 24 is a fragmentary rear elevational view of the parts shown in FIG. 23;

DETAILED DESCRIPTION

FIGS. 1 through 12 are illustrative of a hand-propelled cart or trolley according to a first embodiment of the present invention.

Figure 1:
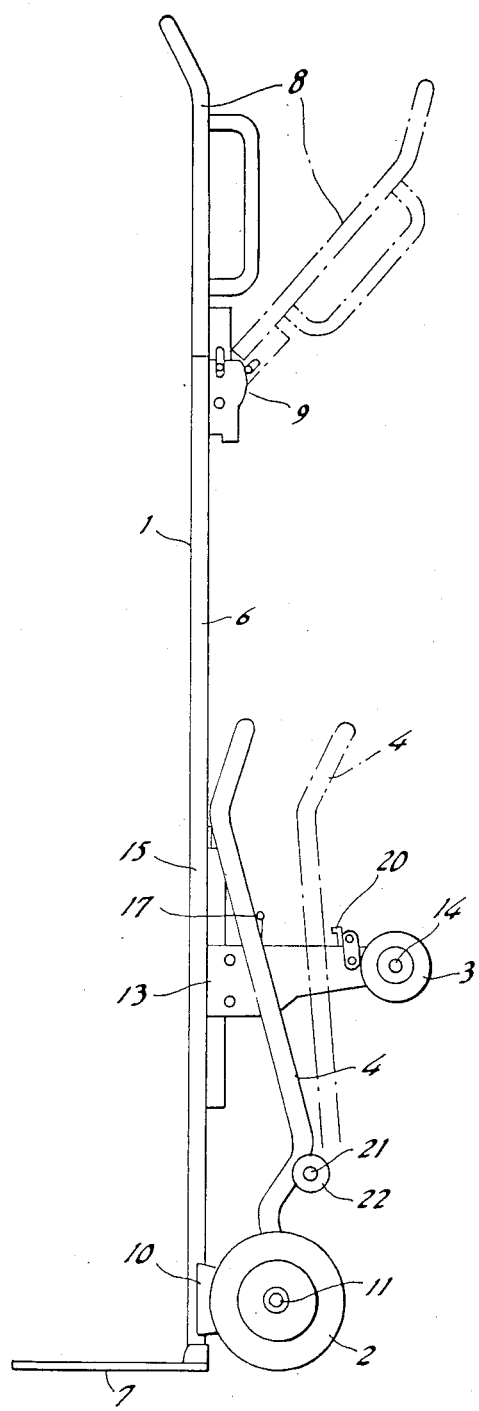
FIG. 1 is a side elevational view of a hand-propelled cart according to a first embodiment of the present invention.
Figure 2:
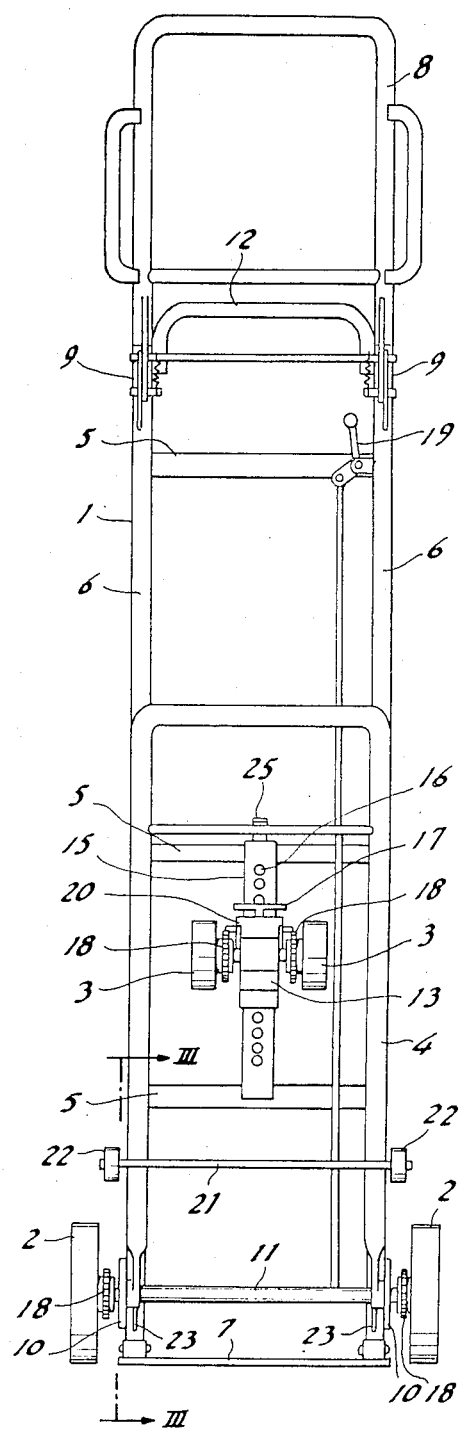
FIG. 2 is a rear elevational view of the hand-propelled cart shown in FIG. 1.
Figure 3:
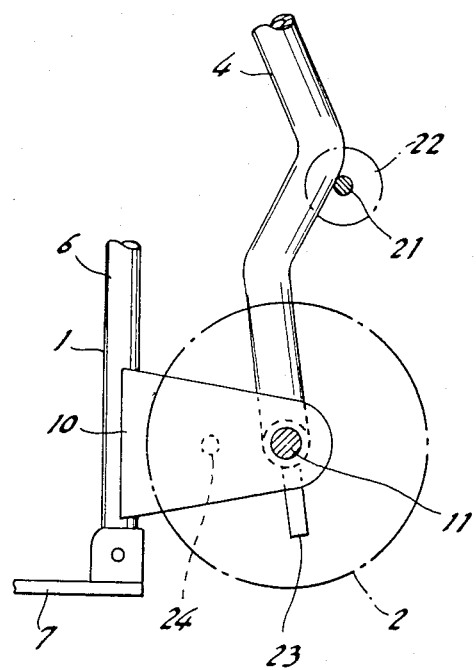
FIG. 3 is a partial cross-sectional view taken along line III—III of FIG. 2.
Figure 4:
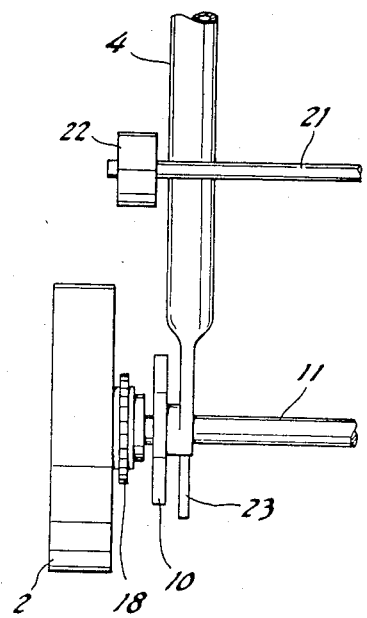
FIG. 4 is a rear elevational view of the parts shown in FIG. 3.

As shown in FIGS. 1 and 2, the hand-propelled cart generally comprises a body 1, a pair of main wheels 2, a pair of auxiliary wheels 3, and a control lever 4.

The body 1 has an L-shaped side elevational configuration and is composed of a pair of laterally spaced side frames 6 interconnected by reinforcing members 5, a cargo rest 7 mounted on lower ends of the side frames 6, a frame-shaped handle 8 pivotably mounted on upper ends of the side frames 6, a locking device 9 mounted on the upper ends of the side frames 6 for locking the handle 8 in a prescribed angular position, a pair of brackets 10 mounted on the lower ends of the side frames 6, and a main shaft 11 mounted on the brackets 10. A second handle 12 is also mounted on the upper ends of the side frames 6 for use at the time the handle 8 is turned downwardly to reduce the length of the cart.

The main wheels 2 are rotatably mounted on opposite ends, respectively, of the main shaft 11. The auxiliary wheels 3 are positioned upwardly of the main wheels 2 and rotatably mounted on an auxiliary shaft 14 extending through a support case 13 slidably fitted over a guide 15 fixed to the cart body 1.

The interaxial distance between the main and auxiliary wheels 2, 3 can be adjusted by sliding the support case 13 along the guide 15. The support case 13 can be fixed in position by inserting a spring-loaded lock pin (not shown) in the slide case 13 into one of the holes 16 defined in the guide 15. The slide case 13 can be slid along the guide 15 by moving a lever 17 to pull the lock pin out of the hole 16 against the bias of the spring.

Each of the main and auxiliary wheels 2, 3 is equipped with a selective reverse lock device comprising a ratcheted freewheel gear 18 of the type which is widely used on bicycles. When a ratchet pawl or pin (not shown) is brought into mesh with the gear 18 associated with each main wheel 2 by a selector lever 19, the main wheel 2 is allowed to rotate only in the direction in which the handle 8 can be pulled. When the ratchet pin is brought out of mesh with the gear 18, the main wheel 2 can be rotated freely back and forth. Likewise, when a ratchet pawl or pin (not shown), associated with each auxiliary wheel 3 by a selector pedal 20, is brought into mesh with the gear 18 the auxiliary wheel 3 is allowed to rotate only in the direction in which the handle 8 can be pulled. When the ratchet pin is brought out of mesh with the gear 18, the auxiliary wheel 3 can be rotated freely back and forth.

The control lever 4 comprises an inverted, substantially U-shaped pipe having lower ends pivotably mounted on the body 1 near the main wheels 2, i. e., the main shaft 11. The control lever 4 has contact means for contacting a floor or landing 26 (FIG. 6) to function as fulcrums when the control lever 4 is turned downwardly (clockwise in FIG. 3), the contact means being positioned radially outwardly of the main wheels 2. In the illustrated first embodiment, the contact means comprise a pair of auxiliary rollers 22 rotatably mounted on opposite ends of a shaft 21 fixed to the control lever 4.

A pair of bars 23 projects from the lower ends of the control lever 4. When the control lever 4 is angularly moved downwardly for a prescribed angular interval, the bars 23 engage stoppers 24 projecting from inner surface of the brackets 10 to stop the turning movement of the control lever 4. Alternatively, the bars 23 may engage other parts than the stoppers 24 to stop the control lever 4. Stated otherwise, any arrangement may be employed to allow the control lever 4 to be turned downwardly for a prescribed angular interval and then lock the control lever 4 against further angular movement.

When not in use, the control lever 4 is put in a storage position in which it is gripped by a clip 25 mounted on the guide 15, as shown in FIGS. 1 and 2.

Operation of the hand-propelled cart according to the first embodiment will be described.

When the cart with a cargo placed thereon is to be moved up a stair, the interaxial distance between the main and auxiliary wheels 2, 3 is adjusted to meet the height and width of a stair step, and the reverse lock devices are actuated to lock the main and auxiliary wheels 2, 3 against reverse rotation. Then, the main and auxiliary wheels 2, 3 are lifted alternately one step after one step while the wheels 3, 2 are being used alternately as fulcrums. When the cart is to be moved down a stair, only the auxiliary wheels 3 are locked against reverse rotation, and the main and auxiliary wheels 2, 3 are lowered alternately one step after one step through leverage. Since the reverse lock devices are actuated for locking the main and auxiliary wheels 2, 3 upon movement up the stair or the auxiliary wheels 3 upon movement down the stair, the cart will not roll down the steps out of control and can be moved up and down the stair with safety.

Figure 5:
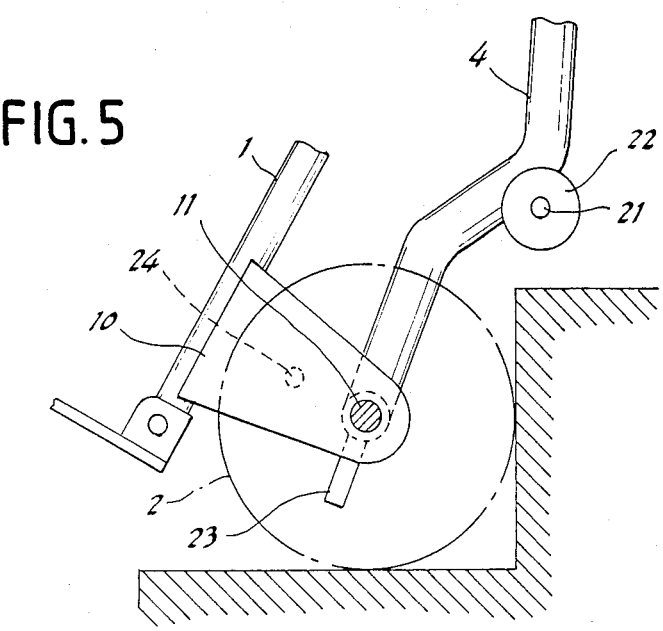
FIGS. 5 through 8 are fragmentary side elevational views illustrative of progressive operation of the hand-propelled cart.
Figure 6:
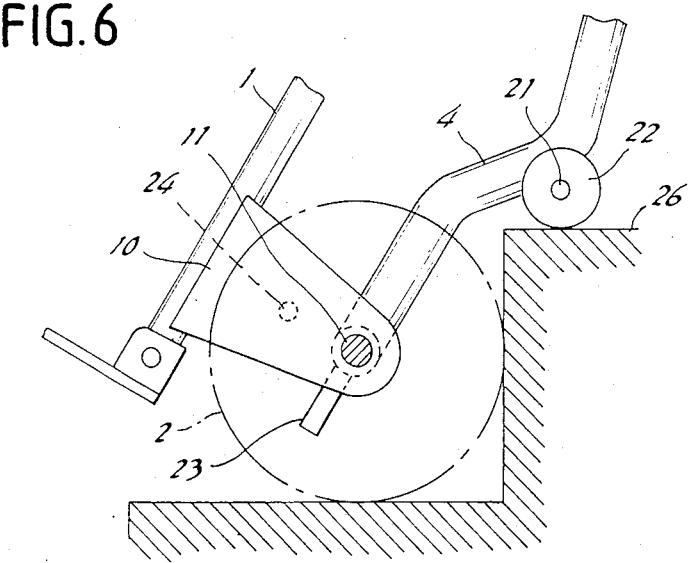

For moving the cart from stair steps onto a small landing 26, the body 1 is slightly tilted back so that the center of gravity of the cart will be positioned over the main shaft 11 (see FIG. 5). Then, while holding the body 1 with one hand, the control lever 4 is turned downwardly about the main shaft 11 with the other hand to bring the contact means or the auxiliary rollers 22 into contact with the landing 26 (FIG. 6).

The upper end of the control lever 4 is then depressed by a foot to turn the control lever 4 further downwardly while the body 1 is being held by hand. The body 1 is now lifted upwardly about the shaft 21.

Figure 7:
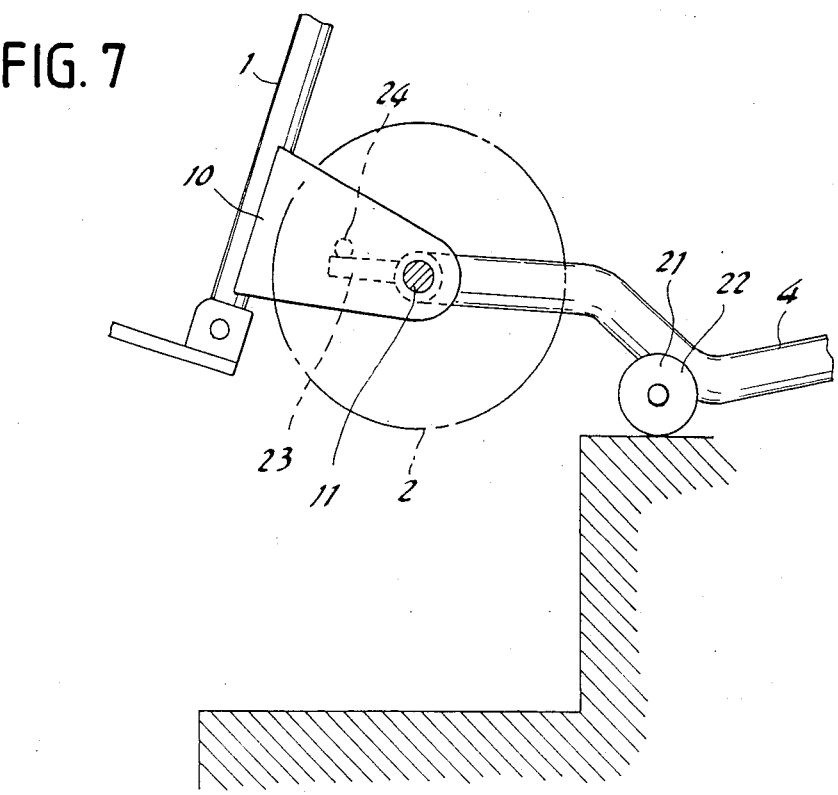
Figure 8:
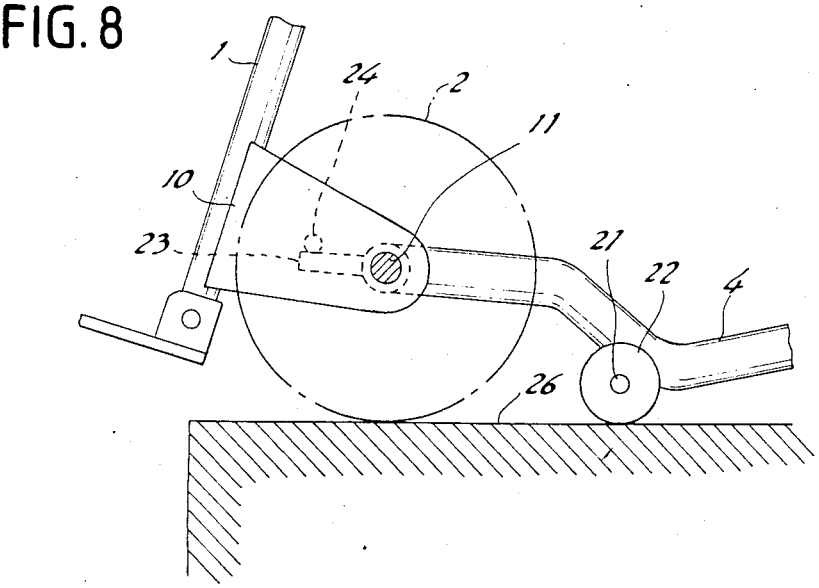
Figure 9:
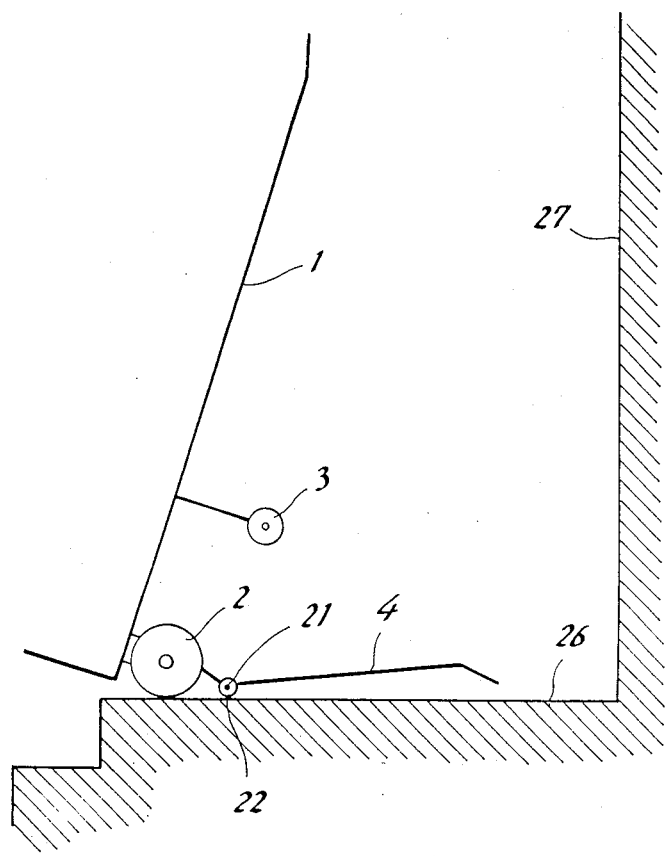
FIG. 9 is a schematic side elevational view of the cart placed on a landing.

After the body 1 has been raised until the main shaft 2 is moved above the landing 26 as shown in FIG. 7, the body 1 is pulled back onto the landing 26 while the user is holding down the control lever 4 by foot pressure as illustrated in the configurations of FIGS. 8 and 9. At this time, the auxiliary rollers 22 on the shaft 21 allow the body 1 to be pulled back with ease. When the body 1 is raised to the position of FIG. 7, the bars 23 of the lever 4 are held in engagement with the stoppers 24. Thus, the body 1 is prevented from being turned counterclockwise in FIG. 7. As long as the control lever 4 is depressed by the foot, the body 1 will not be turned back and down the stair even if the body 1 is released by the user's hands. Consequently, the cart is safely located on the landing 26.

After the body 1 has been put on the landing 26, the control lever 4 is turned counterclockwise about the main shaft 11 and kept in its storage position.

Since the body 1 can be lifted while it is slightly tilted back by the control lever 4, the body 1 will not contact a wall surface 27 (FIG. 9) behind the landing 26. The body 1 with a heavy object placed thereon can easily be lifted by one worker as the body 1 is raised with the rollers 22 on the control lever 4 being used as fulcrums. Because the control lever 4 is relatively short, it will not interfere with the wall surface 27 when turned downwardly.

For moving the cart down from the landing 26, the control lever 4 is angularly displaced to the position shown in FIGS. 8 and 9. While the body 1 is being held by hand, the upper end of the control lever 4 is depressed by one foot, and then the body 1 is pushed forward to the position of FIG. 7. Since the bars 23 of the control lever 4 are held against the stoppers 24 at this time, the body 1 will not be turned back and down the stair steps. Thereafter, the body 1 is allowed to be lowered slowly about the shaft 21 due to gravity to the position of FIG. 5.

Figure 10:
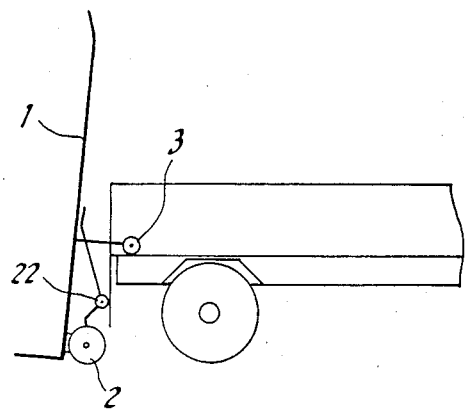
FIGS. 10 through 12 are schematic side elevational views showing the manner in which the cart with an object carried thereon is loaded onto the loading platform or bed of a truck.
Figure 11:
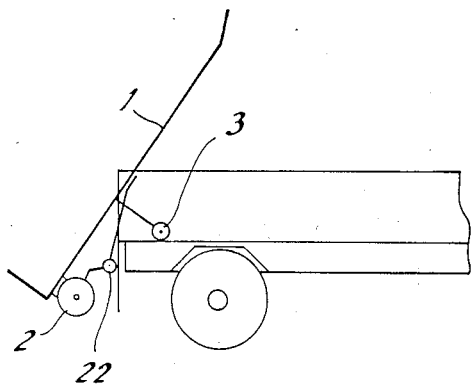
Figure 12:
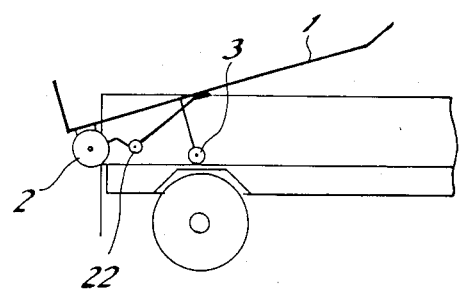

The hand-propelled cart according to the first embodiment can be loaded, together with a cargo such as a refrigerator placed thereon, onto the loading platform or bed of a relatively small truck. More specifically, as shown in FIGS. 10 through 12, the interaxial distance between the main and auxiliary wheels 2, 3 is adjusted to meet the height of the truck bed, and the reverse lock devices are actuated to lock the main and auxiliary wheels 2, 3 against reverse rotation. Then, the cart is positioned as shown in FIG. 10. The body 1 is then lifted about the auxiliary wheels 3 to the position of FIG. 11 by pushing down the handle 8. At this time, the auxiliary rollers 22 are held against a rear platform flap as it hangs down, so that the body 1 is held out of contact with the truck platform. Therefore, the body 1 will not frictionally engage the truck platform when the body 1 is lifted, and hence the body 1 and the truck platform will be prevented from being damaged.

Subsequently, the body 1 is further raised about the auxiliary wheels 3 to the position of FIG. 12, and then the body 1 is pulled back over the platform. With the reverse lock devices actuated, the cart will move back off the platform. The cart with the cargo carried thereon can be unloaded from the platform by reversing the above loading process.

Figure 34:
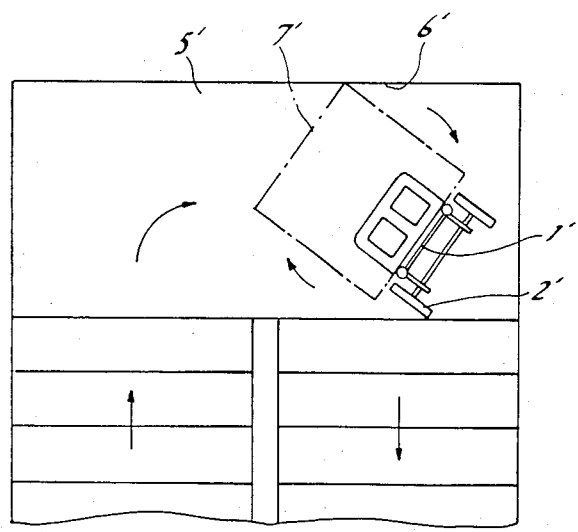

FIGS. 13 through 20 illustrate a hand-propelled cart according to a second embodiment of the present invention. Where a cargo on a hand-propelled cart is large in size, it has heretofore been impossible to reverse the cart smoothly on a small landing as shown in FIG. 34 since the cargo 7' tends to hit a wall 6' or a main wheel 2' abuts against a stair step. The conventional cart has therefore been disadvantageous in that the cart with a large-size cargo carried thereon cannot be moved up and down a stair having such a small landing 5'.

According to the second embodiment, the cart can be transferred from a landing to stair steps or vice versa smoothly and easily, and can smoothly be reversed in its direction on a small landing while a large-size cargo is carried on the cart.

The hand-propelled cart of the second embodiment has a body, main wheels, auxiliary wheels, a control lever and a cargo rest, which are all of substantially the same construction as those of the cart according to the first embodiment, and these components will not be described in detail.

Figure 15:
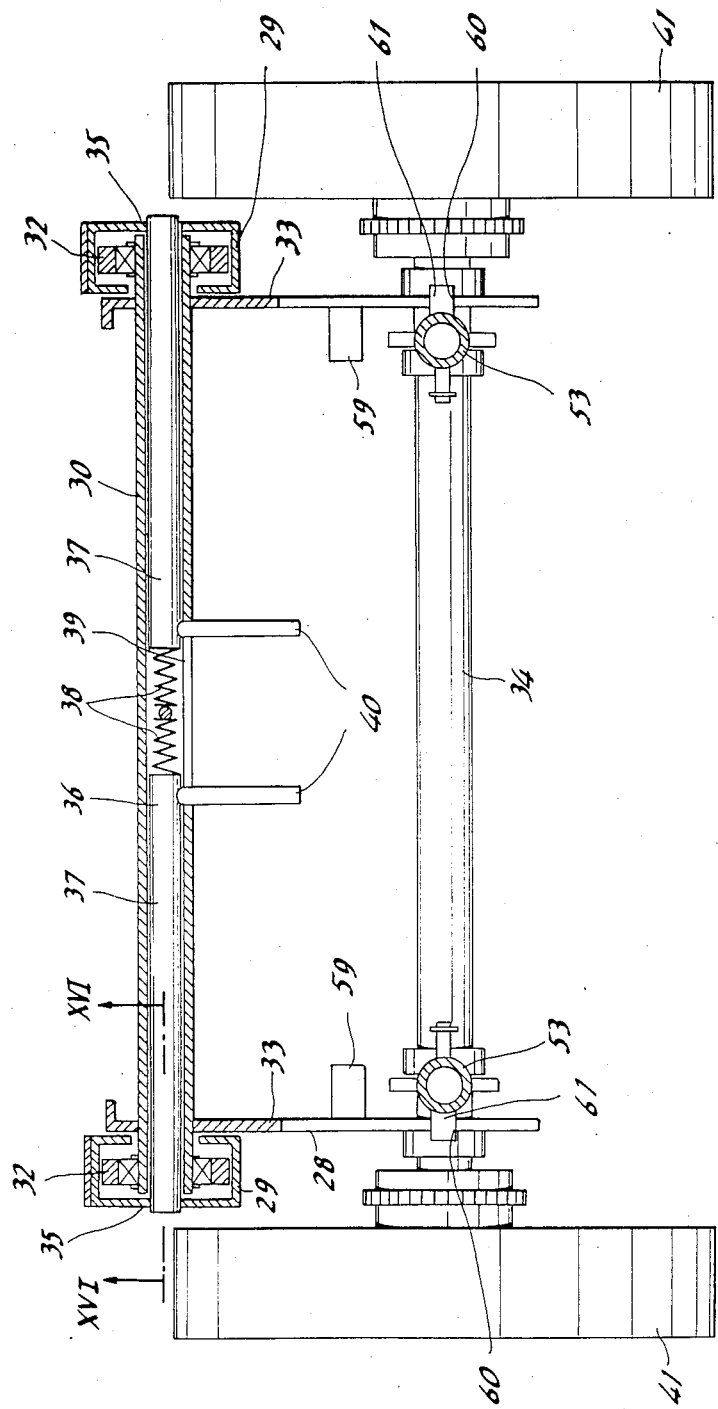
FIG. 15 is a cross-sectional view taken along line XV—XV of FIG. 13.
Figure 16:
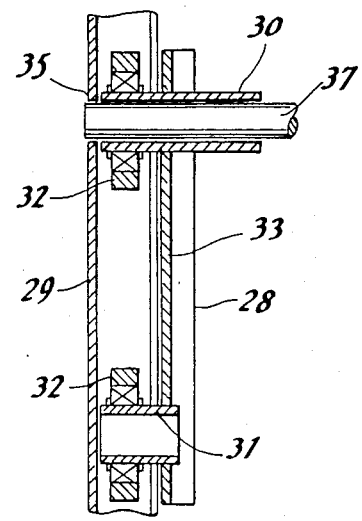
FIG. 16 is a cross-sectional view taken along line XVI—XVI of FIG. 15.

As shown in FIGS. 15 and 16, the hand-propelled cart of the second embodiment includes a vertically movable mechanism 28 comprising upper and lower support pipes 30, 31 having ends positioned in side frames 29, rollers 32 rotatably mounted on the ends of the support pipes 30, 31 for rolling movement on inner surfaces of the side frames 29, laterally spaced brackets 33 fixed to the support pipes 30, 31, and a main shaft 34 mounted on and extending between the brackets 33.

The vertically movable mechanism 28 has a lock mechanism 36 for locking the vertically movable mechanism 28 selectively in the positions of holes 35 defined in the side frames 29. The lock mechanism 36 is composed of a pair of locking rods 37 fitted in the upper support pipe 30 and fittable into the holes 35 in the side frames 29, compression coil springs 38 interposed between the locking rods 37 for normally urging them apart, and a pair of levers 40 fixed to the locking rods 37, respectively, and extending through a slot 39 defined in the upper support pipe 31.

When the levers 40 are gripped by hand and moved toward each other against the resilient forces of the compression coil springs 38, the locking rods 37 are pulled out of the holes 35 in the side frames 29 whereupon the vertically movable mechanism 28 can freely be moved upwardly and downwardly.

Main wheels 41 are rotatably mounted on the vertically movable mechanism 28, that is, on opposite ends of the main shaft 34 thereof.

Figure 17:
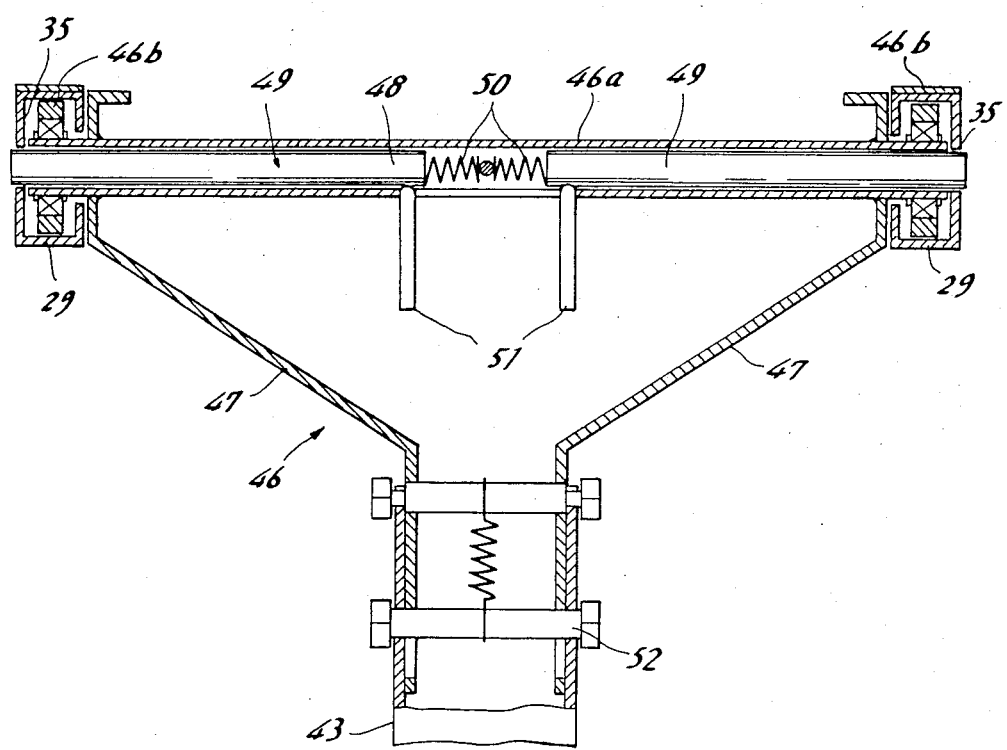
FIG. 17 is a cross-sectional view taken along line XVII—XVII of FIG. 13.

Auxiliary wheels 42 are rotatably mounted upwardly of the main wheels 41 and are vertically movable. More specifically, the auxiliary wheels 42 are rotatably mounted on an auxiliary shaft 44 mounted on a rear support 43 pivotably mounted on a front support 46 vertically movably attached to a cart body 45. As shown in FIG. 17, the front support 46 is composed of support panels 47, a support pipe 46a mounted on and extending between the support panels 47, and a pair of rollers 46b rotatably mounted on opposite ends of the support pipe 46a and disposed in the side frames 29, respectively, and a lock mechanism 48 for locking the front support 46 selectively in the positions of the holes 35 in the side frames 29. The lock mechanism 48 is of the same construction as that of the lock mechanism 36, and comprises a pair of locking rods 49, a pair of compression coil springs 50, and a pair of levers 51. The rear support 43 is pivotably mounted on the front support by means of a bolt 52, and can selectively be fixed in horizontal and vertical positions by means of another lock mechanism operatively connected between the front and rear supports 46, 43.

Therefore, the interaxial distance between the main and auxiliary wheels 41, 42 can be adjusted by vertically moving the vertically movable mechanism 28 of the front support 46.

Figure 13:
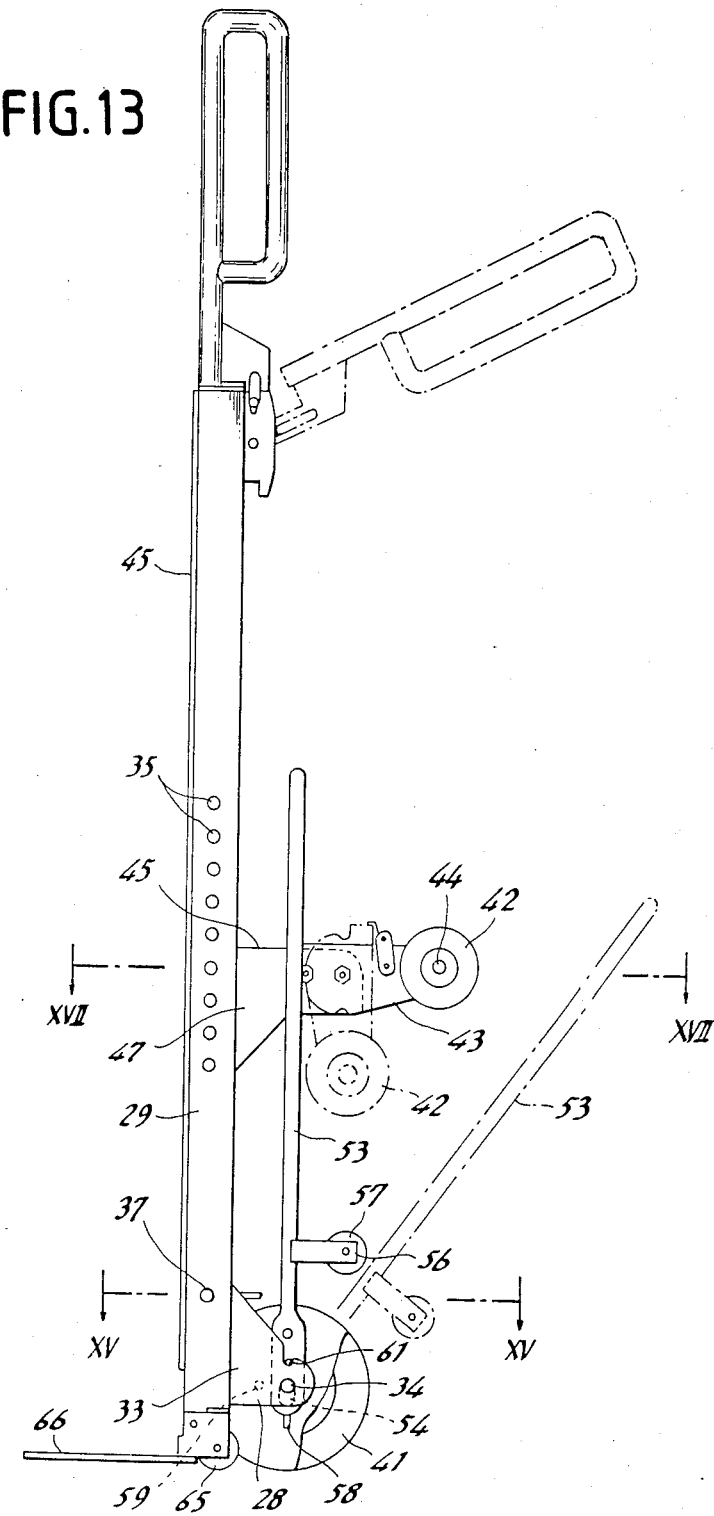
FIG. 13 is a side elevational view, partly broken away, of a hand-propelled cart according to a second embodiment of the present invention.
Figure 14:
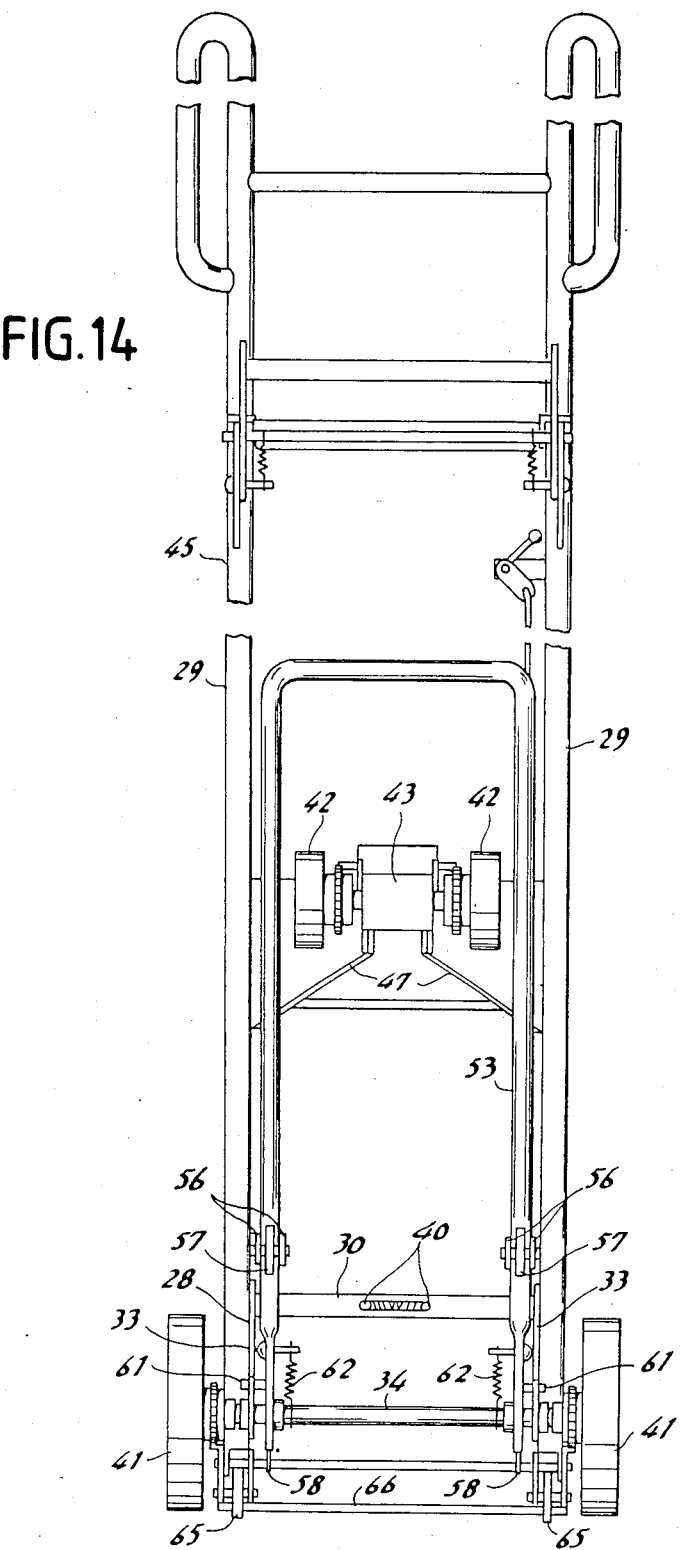
FIG. 14 is a rear elevational view of the hand-propelled cart shown in FIG. 13.

As shown in FIG. 14, a control lever 53 comprises an inverted U-shaped pipe including lower ends having slots 54 defined therein and through which the main shaft 34 of the vertically movable mechanism 28 extends. Thus, the control lever 53 is pivotably mounted on the vertically movable mechanism 28. As shown in FIG. 13, the control lever 53 has contact means for contacting a floor or landing 55 (FIGS. 18 and 19) to function as fulcrums when the control lever 53 is turned downwardly (clockwise in FIG. 13), the contact means being positioned radially outwardly of the main wheels 41. According to the second embodiment, the contact means comprise a pair of auxiliary rollers 57 rotatably mounted respectively on support members 56 fixed to the control lever 53. A pair of bars 58 projects from the lower ends of the control lever 53. When the control lever 53 is angularly moved downwardly for a prescribed angular interval, the bars 58 engage stoppers 59 projecting from inner surface of brackets 33 to stop the turning movement of the control lever 53.

When the control lever 53 is not in use, it is locked in the solid-line position in FIG. 13 by a lock mechanism.

This lock mechanism includes a pair of recesses 60 defined in the brackets 33, respectively, a pair of pins 61 projecting from the control lever 53 for engaging in the respective recesses 60, and a pair of tension springs 62 acting between the control lever 53 and the main shaft 34 for urging the pins 61 in a direction to engage in the recesses 60. By pulling the control lever 53 upwardly against the forces of the tension springs 62 until the pins 61 are disposed out of the recesses 60, the lock mechanism is released to allow the control lever 53 to be turned freely. The cart shown in FIGS. 13 and 14 also includes a cargo rest 66 mounted on the lower end of the cart body 45.

Figure 18:
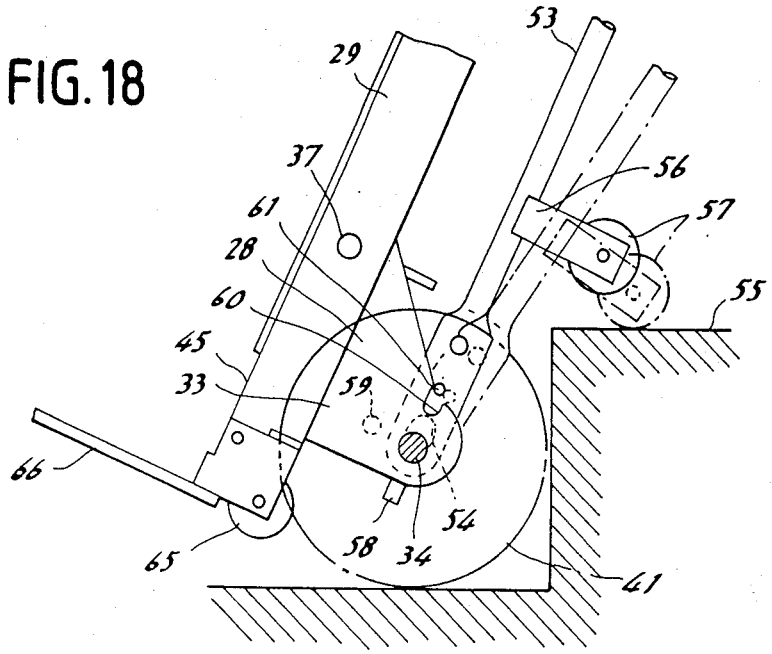
FIGS. 18 through 19 are fragmentary side elevational views showing the manner in which the hand-propelled cart of FIG. 13 is operated.
Figure 19:
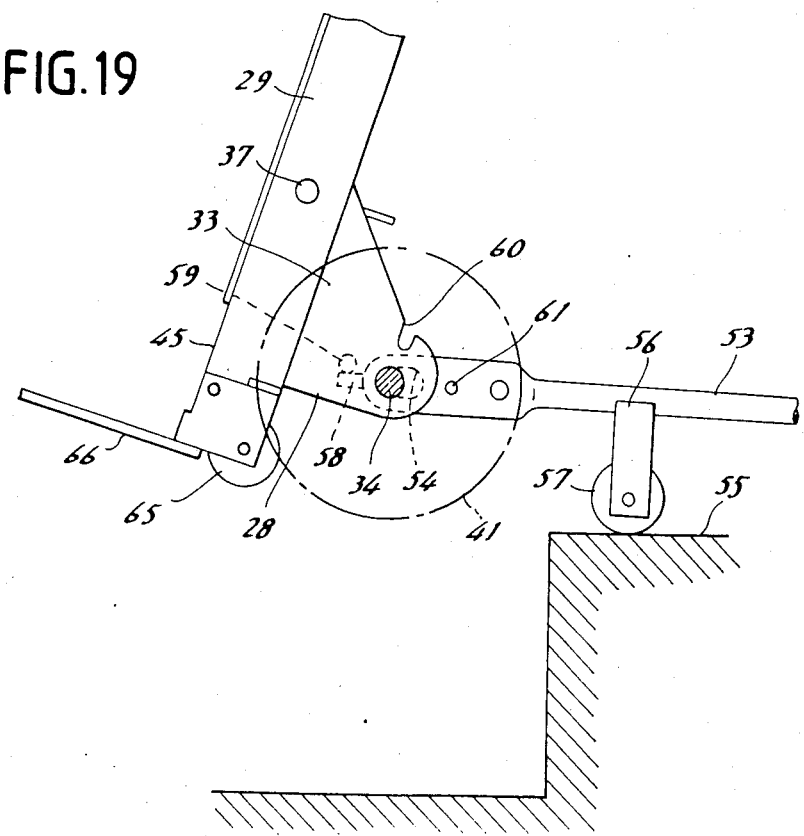
Figure 20:
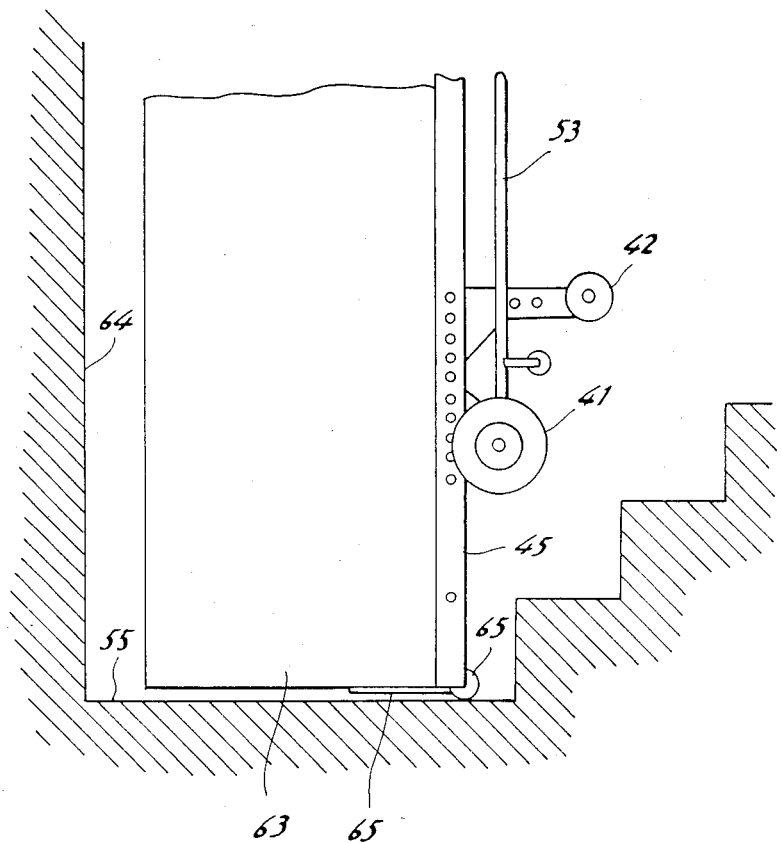
FIG. 20 is a fragmentary side elevational view showing the manner in which the hand-propelled cart of FIG. 13 is reversed in its direction on a landing.

The hand-propelled cart according to the second embodiment will operate as follows:

FIGS. 18 and 19 show the manner in which the cart is moved up and down stair steps. The cart can be moved up and down the steps based on the principle of leverage while using the auxiliary wheels 42 as fulcrums. Such operation is the same as that of the cart of the first embodiment, and hence will not be described specifically.

Where there is a small landing 55 in the stair, the cart is required to be reversed in its direction on the landing 55 before going up a next flight of steps. To meet such a requirement, the vertically movable mechanism 28 is raised to lift the main wheels 41 to a position higher than the height of one step, and then is locked in position by the lock mechanism. Then, the body 45 is turned. Since the main wheels 41 are lifted, they will not abut against steps or a cargo 63 on the cart will not engage a wall 64, so that the cart can smoothly be reversed in its direction. The cart can easily be turned around by means of rollers 65 rotatably mounted on the bottom of the body 45.

A hand-propelled cart according to a third embodiment is illustrated in FIGS. 21 through 30. Where a cart is to be moved through leverage on a small landing following a stair, the control lever cannot be moved through a large stroke. The hand-propelled cart of the third embodiment is designed to function as desired in such a mode of operation.

The hand-propelled cart of the third embodiment has a body, main wheels, auxiliary wheels, a control lever, a cargo rest, and lock mechanisms which are all of substantially the same constructions as those of the cart according to the previous embodiments, and these components will not be described in detail.

As shown in FIGS. 21 and 22, the hand-propelled cart of the third embodiment includes a control lever 67 composed of link-shaped lower levers 68 and frame-shaped upper levers 69 which are pivotably supported on a shaft 70 so that they can be folded upon each other. The lower levers 68 have ends pivotably mounted on a body 72 near main wheels 71, that is, a main shaft 73. The shaft 70 about which the levers 68, 69 are foldable is positioned radially outwardly of the main wheels 71. The upper levers 69 are of a telescopic construction and, when not in use, are contracted into a storage position indicated by the solid lines in FIG. 21. Auxiliary rollers 74 are rotatably mounted on opposite ends of the shaft 70.

Between the lower levers 68 and the body 72, that is, brackets 75, there are first lock mechanisms 76 for locking the lower levers 68 against downward movement (clockwise in FIG. 23). Each of the first lock mechanisms 76 includes a first L-shaped guide hole 77 defined in the lower lever 68, a first locking rod 78 extending through the first guide hole 77 for abutting engagement with the bracket 75, and a tension spring 79 acting between the first locking rod 78 and a lower end of the lower lever 68. The first lock mechanism 76 also includes a main abutment 80 on the bracket 75 for preventing the lower lever 68 from turning clockwise, an intermediate abutment 81 on the bracket for preventing the lower lever 68 from turning counterclockwise, a cam surface 82 on the bracket 75 for pushing the first locking rod 76 upwardly in the first guide hole 77, and a return abutment 83 on the bracket 75 for returning the first locking rod 78 from an upper position to a lower position in the first guide hole 77.

Between the lower levers 68 and the upper levers 69, there are second lock mechanisms 84 for locking the upper levers 69 against downward movement (clockwise in FIG. 23). Each of the second lock mechanisms 84 includes a second L-shaped guide hole 85 defined in the upper lever 69, a second locking rod 86 extending through the second guide hole 85 for abutting engagement with the lower lever 68, and a tension spring 87 acting between the second locking rod 86 and the shaft 70. Each second lock mechanism 84 also includes a main abutment 88 and a second abutment 89 on the lower lever 68 for preventing the upper lever 69 from turning clockwise, a cam surface 90 on the lower lever 68 for pushing the second locking rod 86 upwardly in the second guide hole 85, a first return abutment 91 on the lower lever 85 for latching the second locking rod 86 in an upper position in the second guide hole 85, and a second return abutment 92 on the lower lever 68 for returning the second locking rod 86 from the upper position to a lower position in the second guide hole 85.

The cart shown in FIGS. 21 and 22 also includes a pair of auxiliary wheels 93, and a cargo rest 94.

Figure 26:
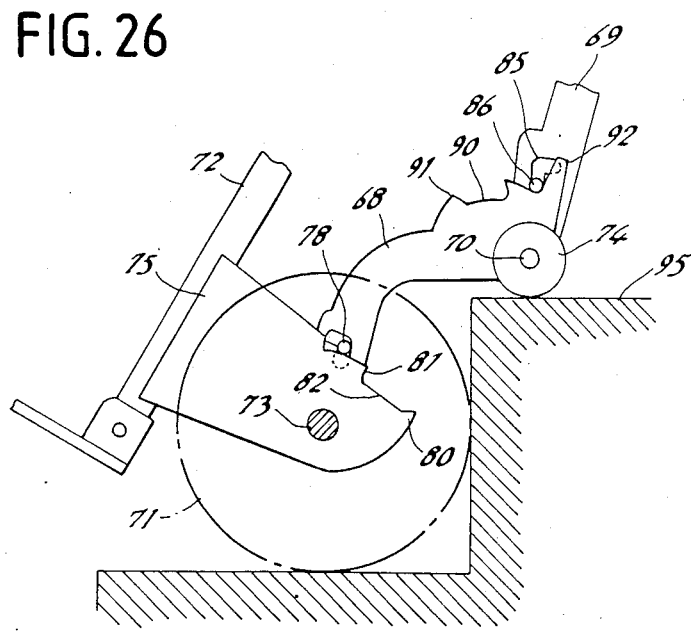

The hand-propelled cart according to the second embodiment will operate as follows: For moving the cart from a stair step onto a small landing 95, the body 72 is tilted back to bring the center of gravity over the shaft 70, and the control lever 67 is turned about the shaft 70 until the auxiliary rollers 74 contact the landing 95 (FIG. 26). At this time, the upper levers 69 are prevented from turning clockwise by the second locking rod 86 engaging the main abutments 80 on the lower levers 68.

Figure 27:
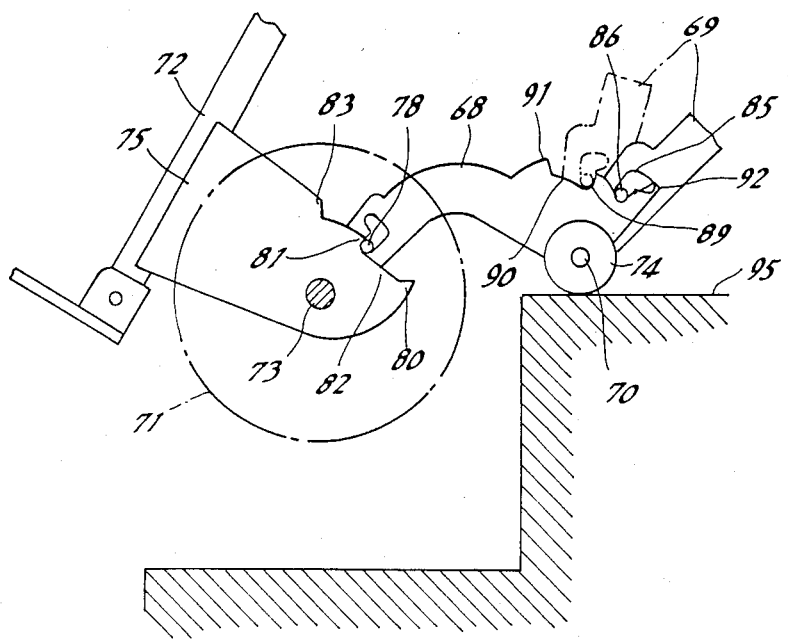

Then, the upper levers 69 are extended, and the body 72 is held by one hand while the upper levers 69 are angularly moved by the other hand clockwise about the shaft 70 through a certain angular interval to lift the body 72 slightly upwardly as shown in FIG. 27. The upper levers 69 are turned until the first locking rod 78 engages the intermediate abutments 81 on the lower levers 68.

Thereafter, while the body 72 is held by one hand, the upper levers 69 are turned from the solid-line position to the dot-and-dash-line position in FIG. 27 to bring the second locking rod 85 into abutment against the second abutment 89, whereupon the upper levers 69 are prevented from turning clockwise relatively to the lower levers 68.

Figure 28:
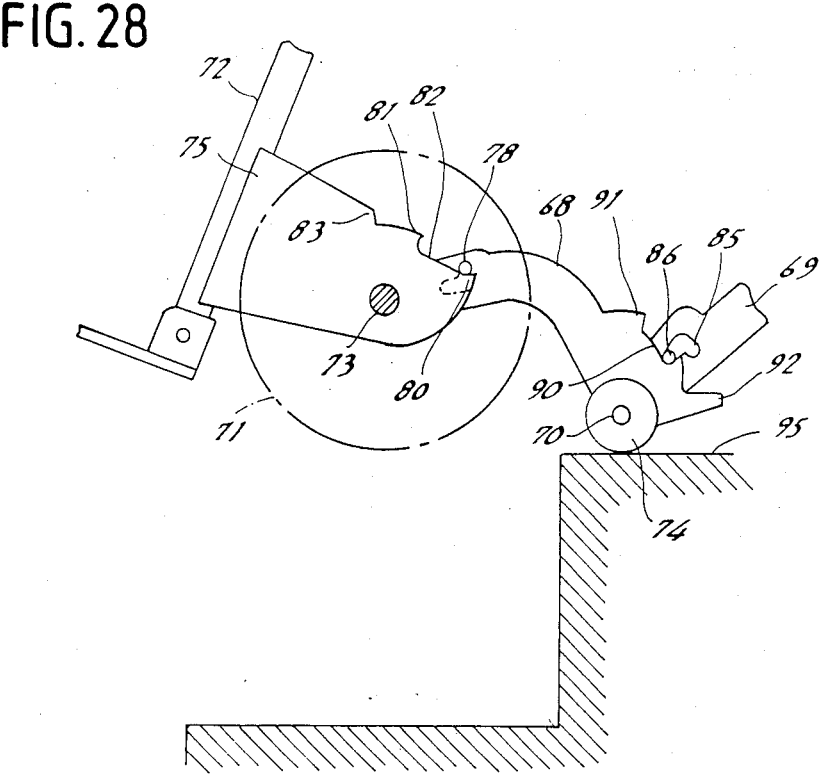
Figure 29:
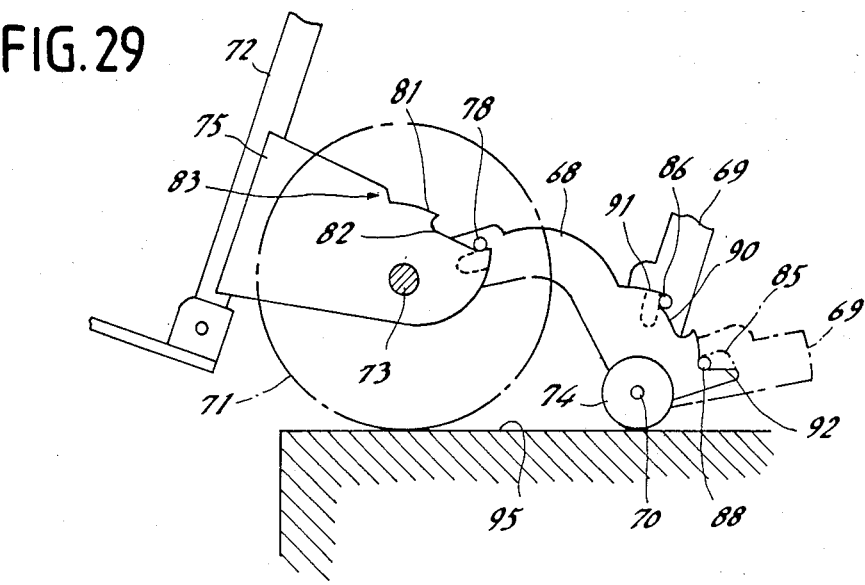

The upper levers 69 are now forcibly turned clockwise to lift the body 72 until the shaft 73 is positioned above the landing 95 as illustrated in FIG. 28. At this time, the first locking rods 78 slide against the cam surfaces 82 into abutment against the main abutments 80 while being pushed upwardly in the first guide holes 77. Therefore, the body 72 is prevented from turning counterclockwise about the main shaft 73.

Figure 30:
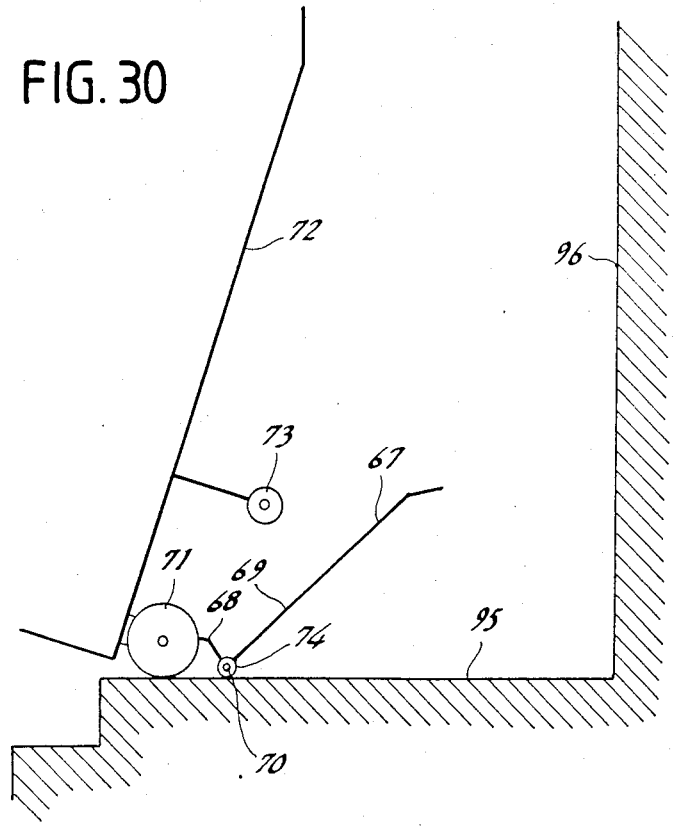
FIG. 30 is a schematic side elevational view of the hand-propelled cart of FIG. 21 as it is put on a landing.
Figure 31:
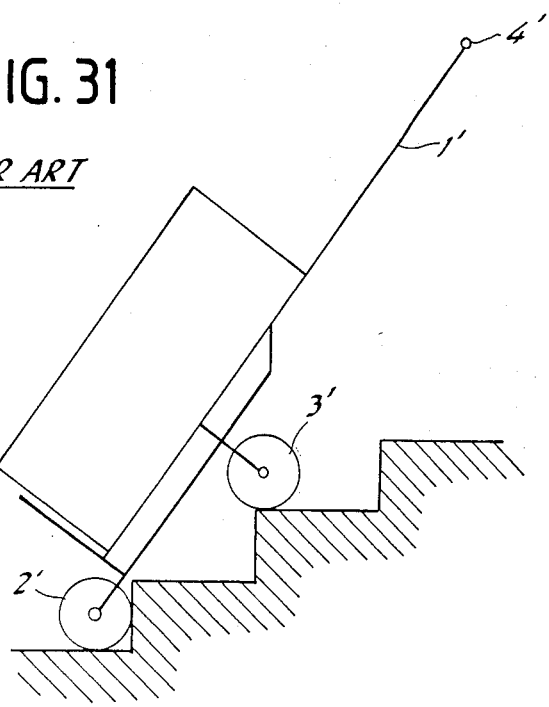
FIGS. 31 through 34 are schematic views illustrative of operation of the a conventional hand-propelled cart.
Figure 32:
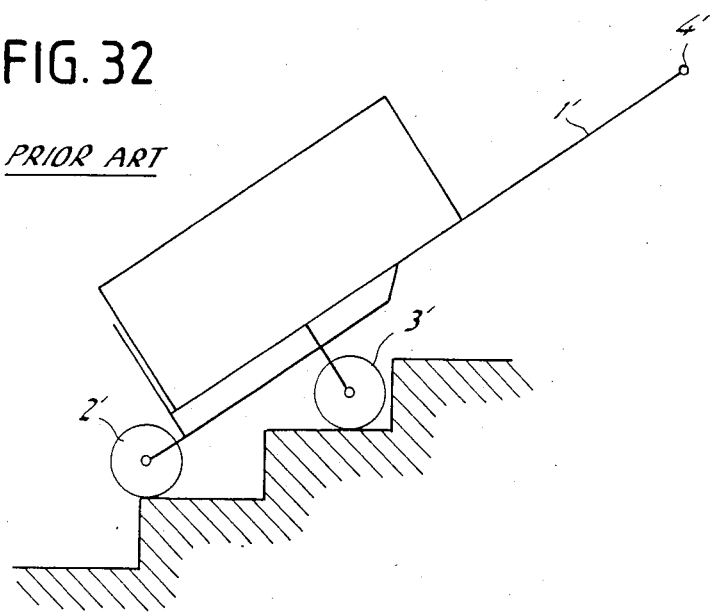
Figure 33:
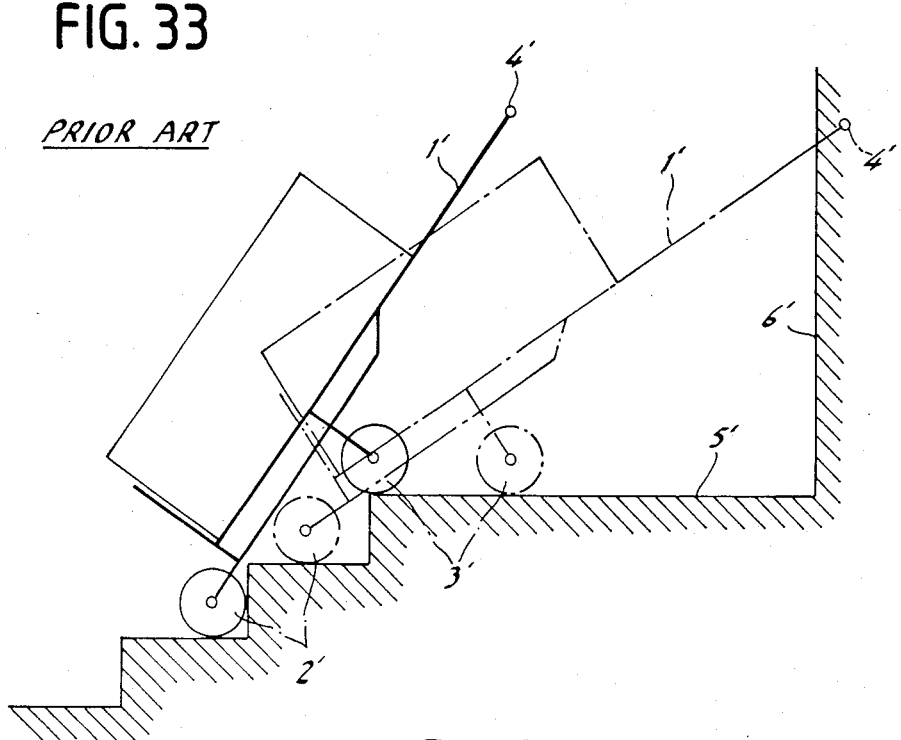

After the body 72 has been raised to the position of FIG. 28, the control lever 67 is pulled back to place the body 72 onto the landing 95 as shown in FIG. 30. At this time, the auxiliary rollers 74 on the shaft 70 allow the body 72 to be pulled back easily.

Since the body 72 can be lifted in a slightly tilted posture by the control lever 67, as described above, the body 72 will not engage a wall surface 96 behind the landing 95. The body 72 with a heavy cargo carried thereon can easily be lifted by one worker as the auxiliary rollers 74 on the control lever 67 are used as fulcrums in raising the body 72. The stroke of turning movement of the control lever 67 can be short because the control lever 67 is telescopically actuated in raising the body 72.

After the body 72 has been placed on the landing 95, the control lever 67 is brought back to its storage position. More specifically, the upper levers 69 are turned counterclockwise from the position of FIG. 28 to the solid-line position of FIG. 29. The second locking rod 86 is pushed upwardly in the second guide holes 85 while sliding against the cam surfaces 90, and then is latched in the upper position in the second guide holes 85 by the first return abutments 91. By turning the upper levers 69 from the solid-line position to the dot-and-dash-line position in FIG. 29, the second locking rod 86 abuts against the second return abutment 92 and is released out of the upper position in the second guide holes 85. The second locking rod 86 is moved downwardly in the second guide holes 85 under the resiliency of the tension springs 87 and then brought into abutment against the main abutments 88. Thereafter, the lower levers 68 are turned counterclockwise from the position of FIG. 29. At this time, the first locking rod 78 is latched in the upper position in the first guide holes 77. The turning movement of the lower levers 78 to the position of FIG. 25 causes the first locking rod 78 to abut against the return abutments 83 and be unlatched from the upper position in the first guide holes 77. The first locking rod 78 is now allowed to move downwardly in the first guide holes 77 under the bias of the tension springs 79. Thus, the control lever 78 is stored in the storage position.

Figure 25:
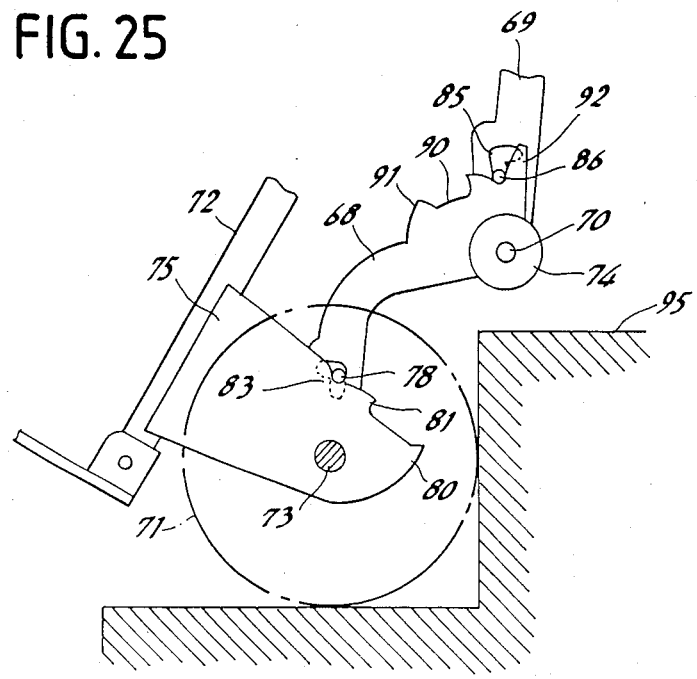
FIGS. 25 through 29 are fragmentary side elevational views showing progressive operation of the hand-propelled cart of FIG. 21.

For lowering the cart from the landing to a stair step, the upper and lower levers 69, 68 are relatively positioned as shown in FIG. 25, and the lower levers 68 and the brackets 75 are relatively positioned as illustrated in FIG. 28. Then, the body 72 is held by hand, and the upper levers 69 are depressed by foot. The body 72 is now pushed forward. During this time, the body 72 is prevented by the first lock mechanisms 76 from being turned back downstairs. Therefore, the body 72 will not be turned down the stair steps even if the body 72 is released of operator's hands. The cart is thus quite safe in operation.

Subsequently, the body 72 is slowly moved down the stair by gravity while the auxiliary rollers 74 are being used as fulcrums.

While the control lever 67 has been described as being actuated by hand in lifting the body 72, the control lever 67 may be actuated by foot. More specifically, the upper levers 67 are contracted, and depressed by foot to turn clockwise from the position of FIG. 26 for thereby lifting the body 72 to the position of FIG. 28. Thereafter, the body 72 is pulled back. Although the control lever 67 has to be turned through a longer stroke when it is actuated by foot, the control lever 67 will not engage the wall 96 behind the landing 95 as the upper levers 69 are contracted.

With the arrangement of the present invention, the cart with a heavy object or cargo carried thereon can safely and easily be moved up and down a stair by a single worker. When the cart is to be moved onto a small landing following the stair, the cart body or cargo will not hit a wall around the landing, and can easily be reversed in its direction smoothly. The cart can also easily be loaded onto and unloaded from a truck. Since the control lever can be stored against the body when not in use, it will not interfere with the surroundings of the workplace.

Although certain preferred embodiments of the present invention have been shown and described in detail, it should be understood that various changes and modifications may be made therein without departing from the scope of the appended claims.

What is claimed is:

1. A hand-propelled cart comprising:
   (a) a body having a pair of laterally spaced side frames each provided with an inner surface;
   (b) a vertically movable mechanism movable along said body, said vertically movable mechanism comprising an upper support pipe having ends positioned respectively in said side frames, a lower support pipe having ends positioned respectively in said side frames, rollers rotatably mounted respectively on said ends of said upper and lower support pipes for rolling engagement with said inner surfaces of said side frames, and a pair of brackets fixed to said upper and lower support pipes;
   (c) a pair of main wheels rotatably mounted on said vertically movable mechanism at a lower end portion of said body;
   (d) a pair of auxiliary wheels rotatably mounted on said body above said main wheels; and
   (e) a control lever pivotably mounted on said vertically movable mechanism and having contact means disposed radially outwardly of said main wheels for contacting a floor to function as a fulcrum when said control lever is turned downwardly, for lifting said body and said main wheels off the floor through the leverage of said control lever.

2. A hand-propelled cart according to claim 1, further including rollers on a lower end of said body, whereby said body can be turned in direction by said rollers when said vertically movable mechanism is displaced upwardly.

3. A hand-propelled cart according to claim 1, further including a main shaft supporting said main wheels and rotatably supported by said brackets, and a lock mechanism having a locking rod slidably fitted in said upper support pipe and movable selectively in and out of holes defined in said side frames for locking said vertically movable mechanism positionally with respect to said body.

4. A hand-propelled cart comprising:
   (a) a body having a substantially L-shaped side elevational configuration and including a handle and a cargo rest;
   (b) a pair of main wheels rotatably mounted on a lower end portion of said body;
   (c) a pair of auxiliary wheels rotatably mounted on said body above said main wheels;
   (d) a foldable control lever pivotably mounted on said body adjacent to said main wheels and composed of lower and upper levers pivotably interconnected by pivots disposed radially outwardly of said main wheels for contracting a floor to function as a fulcrum when said control lever is turned downwardly, for lifting said body and said main wheels off the floor through the leverage of said control lever;

(e) a first lock mechanism disposed between each of said lower levers and said body for locking each said lower lever against downward angular movement; and (f) a second lock mechanism disposed between said lower and upper levers in each pair for locking said upper levers against downward angular movement.

* * * * *